United States Patent

[11] 3,621,942

| | | |
|---|---|---|
| [72] | Inventor | Sten Henrik Danieli<br>Vasteras, Sweden |
| [21] | Appl. No. | 878,804 |
| [22] | Filed | Nov. 21, 1969 |
| [45] | Patented | Nov. 23, 1971 |
| [73] | Assignee | Allmanna Svenska Elektriska Aktiebolaget<br>Vasteras, Sweden |
| [32] | Priority | Nov. 22, 1968 |
| [33] | | Sweden |
| [31] | | 15,895/1968 |

[54] MARSHALLING YARD RETARDER
10 Claims, 5 Drawing Figs.

[52] U.S. Cl. .................................................. 188/62
[51] Int. Cl. .................................................. B61k 7/08
[50] Field of Search........................................ 188/62;
246/182 A; 303/18

[56] References Cited
UNITED STATES PATENTS
3,360,304 12/1967 Adams et al. ................ 188/62 X 3,519,107  7/1970  Bellinger ..................... 188/62

FOREIGN PATENTS 933,377  8/1963  Great Britain................ 188/62

Primary Examiner—Duane A. Reger
Attorney—Jennings Bailey, Jr.

ABSTRACT: A marshalling yard retarder includes a mechanical braking means with elongated braking members on both sides of the rail movable towards and from the vertical plane of the rail to engage against a wheel rolling on the rail. The braking members are pivoted about horizontal axes and are actuated by hydraulic pistons which are flexibly mounted. The cylinders are supplied by a supply conduit containing a non-return valve and a return conduit having a pressure-limiting overflow member which is connected to a storage tank from which the pressure medium is drawn. There may be two pressure-limiting overflow members set for different pressures, and a weighing means for selectively connecting these members to the return line.

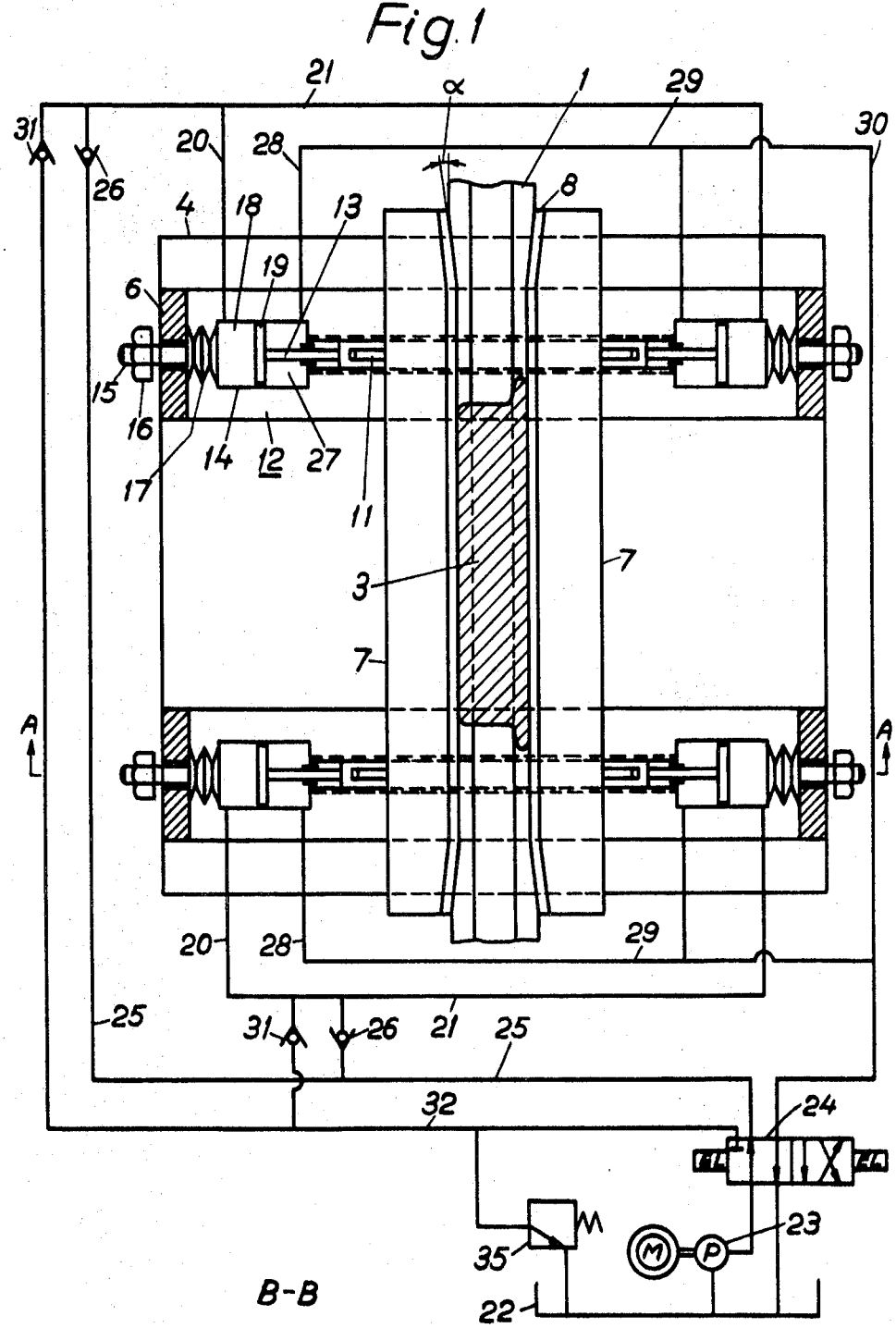

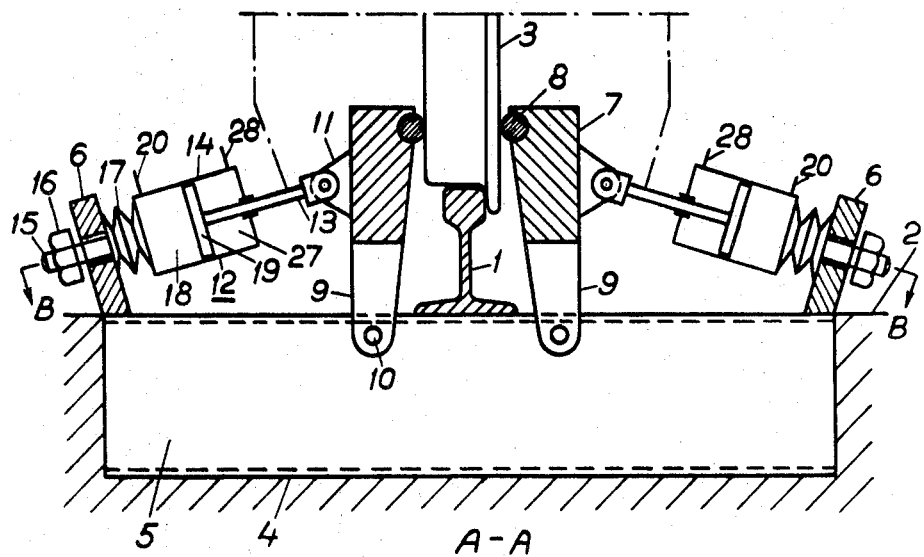
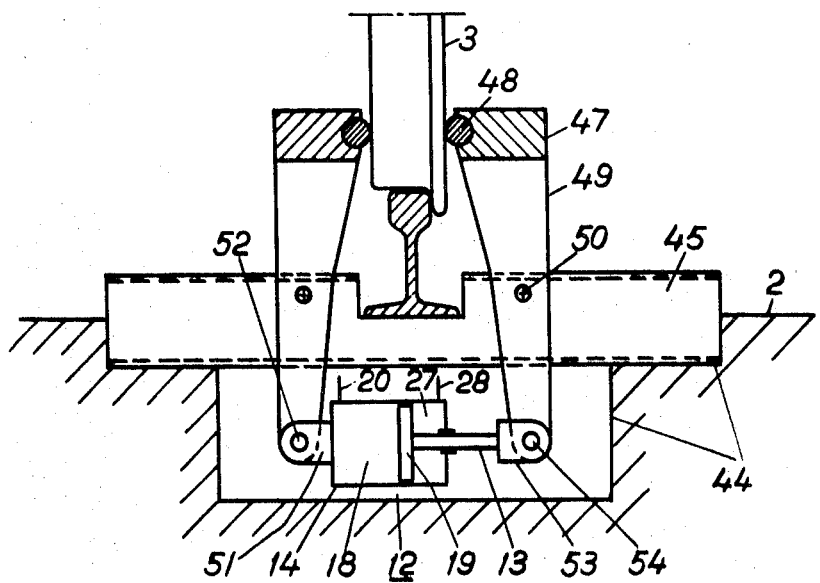

INVENTOR
STEN HENRIK DANIELI

BY
Jennings Bailey

MARSHALLING YARD RETARDER

BACKGROUND OF THE INVENTION

1. Field of the Invention

The present invention relates to a marshalling yard retarder comprising a stationary braking means with elongated braking members on both sides of a rail. The braking means are arranged in displaceable or foldable holders which can be moved by operating members towards a vertical plane parallel to the rail so that, because of pressure contact with a wheel passing the rail, the braking means produces a braking effect.

2. The Prior Art

Hydraulic or pneumatic marshalling yard retarders with braking means of the above-mentioned type are known with various systems for putting the braking means in contact with the sides of the wheels. Since there is only limited space for the operating member in vertical direction, small dimensions are aimed at for the cylinders to place the braking members in direct contact with the help of horizontal operating cylinders which influence the braking rails. A hydraulic operating system with high working pressure provides the best operation, in spite of the fact that, contrary to a pneumatic system, it must normally be provided with separate spring elements for a wheel to be able to penetrate between the braking rails which are ready for a braking process. The high pressure requires expensive high-pressure pumps to supply the pressure system with pressure medium.

SUMMARY OF THE DISCLOSURE

The brake according to the invention is provided with operating cylinders which directly activate the elongated braking members and can operate them between an off-position where a car or an engine can pass the brakes freely and an operating or ready-position to brake the wheels of a passing car. The operating cylinders are supplied with pressure medium from a pressure medium source with a working pressure which is suited to the pressure requirement for operating the braking members between the off-position and the ready-position. In the ready-position for braking, the distance between the braking members is less than the width of a car wheel. The necessary pressure against a wheel is obtained when this rolls in between the braking members and increases the distance between these and thus pushes back the pistons in the operating cylinders, thus also increasing the oil pressure in the system. An important advantage is that the pressure against the sides of the wheel is low just when the wheel penetrates between the bars and only reaches its full value when the wheel has pushed the bars a substantial distance apart. A smoother braking is obtained in this way when the wheel enters the braking system. Since the inherent resilience in the hydraulic system is exploited during the time when the braking bars are pushed apart, the oil volume which must be pressed out through a pressure-limiting outflow valve is small and can thus be well controlled.

According to the invention the pressure increase is made possible because the operating member consists of a hydraulic cylinder with an operating piston and the space on one side of the piston communicates through a supply conduit and a nonreturn valve in this conduit, with a pressure medium source so that pressure medium can flow without obstruction to the operating cylinder and hold the braking members in ready-position, and through a return conduit with at least one overflow valve which communicates with a storage tank for pressure medium. Through this embodiment of the brakes simple, cheap low-pressure systems can be used to supply the brakes and the energy consumption is low. The opening pressure of the overflow valve is adapted to the desired braking pressure. The opening pressure considerably exceeds the pressure in the system for supplying the brakes. A simple hydraulic pump may be used as pressure medium source. The braking members on both sides of the rails can be operated by common cylinders connected to both or by separate cylinders. These separate cylinders are arranged in pairs and, through a common return conduit and an overflow valve in this conduit, communicate with the storage tank for pressure medium. By this arrangement a hydraulic connection is achieved which allows the pressure on each side of the braking members to be completely balanced.

A certain resilience in the operating system of the braking members is desirable. This can be achieved either by attaching the operating cylinders in resilient manner or by making the hydraulic system itself sufficiently resilient, for example by inserting a small pressure accumulator. It is advantageous to design the brakes so that the braking pressure can easily be regulated, either manually or by an emitter which supplies impulses to adjust the braking pressure to a suitable value. This can be effected by using an overflow valve with easily controlled opening pressure or several parallel-connected overflow valves set for different pressures. In the latter case a valve member is necessary for alternative connection of the valve set for a suitable pressure level. It is desirable to regulate the pressure in relation to the weight of the car so that the greatest possible braking effect is always obtained without risk of lifting the braked wheel, thus resulting in derailing. This control can be effected by manual adjustment of the opening pressure of the overflow valve or by manual connection of valves with suitable opening pressure when several parallel-connected valves with predetermined opening pressure are used. A car weighing means can be used as emitter for automatic adjustment of the opening pressure or for connection of suitable overflow valves depending on the weight of a car passing the weighing means on its way to the brakes. Normally the braking members are so long that several successive operating cylinders are required. Between common operating cylinders or between two cylinders arranged as a pair and overflow valves or parallel-connected overflow valves which are common for the whole braking system, a nonreturn valve is required.

BRIEF DESCRIPTION OF THE DRAWINGS

The invention will be further described with reference to the accompanying drawings.

FIG. 1 shows partly in section a brake seen from the top partly in section on line B—B of FIG. 2.

FIG. 2 shows a vertical section through the brake according to FIG. 1 on the line A—A of FIG. 1.

FIG. 3 shows the corresponding section in an alternative embodiment of the brake.

Figure 4:
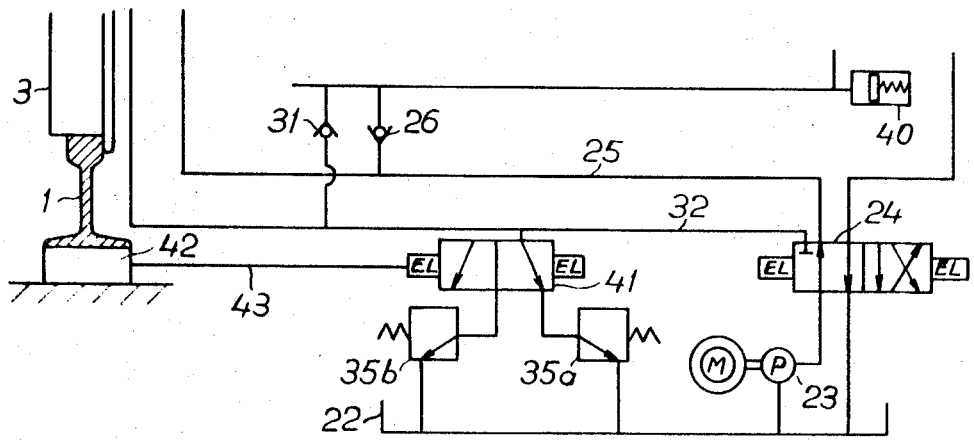
FIGS. 4 and 5 show variations of the embodiment shown in FIG. 1.

In the drawings 1 designates a rail in a railway track in a marshalling yard 2, and 3 is a wheel of a railway truck running on the rail, which is to be braked. Below the rail 1 is a pit 4 in which, according to the embodiment of FIG. 2, there are two pairs of transverse U-beams 5 with brackets 6 at their ends. The brake has two braking bars 7 which run parallel to the rail and have replaceable wear bars 8. The outer parts of the bars form a certain angle α with the rail 1 so that between the bars a wedge-shaped entrance is formed for the wheel of a railway car. The bars are provided with brackets 9 and are turnably journaled about axes 10 between a pair of U-beams 5. They are also provided with brackets 11. The braking bar 7 is operated by a hydraulic cylinder 12, the piston rod 13 being flexibly attached to the bracket 11 and the cylinder housing 14 being attached to the bracket 6 by means of a rod 15 and nut 16. Between the cylinder housing 14 and the bracket 6 is a spring stack 17 or plate springs. The spaces 18 on the front sides of the piston 19 remote from the braking bars 7 are connected through the conduits 20 to a common supply conduit 21 which is fed with pressure oil from the container 22 and the pump 23 through an electrically adjustable valve 24, the conduit 25 and the nonreturn valve 26, when the valve 24 assumes the position shown in the drawings. The space 27 at the other side of the piston 19 then communicates freely with the container 22 through the conduits 28, 29 and 30 and the valve 24. The operating cylinders are now held in an operating position or ready-position to brake a car running in. The braking bars can be moved by the cylinders 12 to a free position where cars and engines can freely pass the brakes. This is effected by resetting the valve 24 so that pressure oil flows from the pump 23 through the valve 24, conduits 30, 28 and 28 to the cylinder space 27. The oil in the space 18 is pressed through the conduits 20 and 21, nonreturn valve 31, conduit 32 and valve 24 to the container 22. When the braking bars 7 are in their ready-position and there is no wheel between the bars, the free passage between them is somewhat less than the width of a wheel to be braked. When a wheel 1 runs between the bars it presses these apart so that the pistons 19 are pressed into the cylinders 14. As the pistons are pressed in, the pressure in the cylinders increases and compresses the spring stack 17 as shown in the drawings since the nonreturn valves 26 prevent the oil from flowing back into the supply conduit 25 and the overflow valve 35 is set to open at an operating pressure which considerably exceeds the pressure of the oil from the pump 23. The operating pressure is limited to the opening pressure set for the valve 35. Thus the necessary operating pressure for braking is generated in the brakes by the car itself. The valve 35 may be designed so that the opening pressure can easily be adjusted manually or automatically depending on the weight of the car to be braked. A car weighing means may be used, for example, as an emitter. Control of the braking pressure may also be obtained by means of a number of parallel valves 35 which are permanently set for different opening pressures. In this embodiment a valve is required to connect the correct valve to brake a car of a certain weight.

The operating cylinders 12 must be resilient so that contact pressure is obtained even if there is a slight leakage in the valve or if the wheel varies in width along its periphery. The resiliency can be obtained from a spring stack between the operating cylinder and a support which takes up the pressure from the cylinder. It may also be obtained by connecting small pressure accumulators 40 in the system. In certain cases the resilience in the cylinders may be sufficient to attain the desired effect.

In the embodiment according to FIG. 3, there is a pit 44 in which two pairs of transverse U-beams 45 are located. The brake is provided with braking bars 47 having wear bars 8 and brackets 49 which are approximately centrally journaled about an axis 50 between a pair of the transverse U-beams 45. The brackets project into that part of the pit 44 lying under the U-beams 45. The operating cylinder 12 is placed in the pit under the beams. The cylinder housing 14 in this embodiment is provided with attachment ears 51 and with a pin 52 flexibly attached to one bracket 49 of the braking bar 47. The operating rod 13 of the cylinder 12 is attached with ears 53 and a pin 54 to the other bracket 49 of the braking bar 47.

FIG. 4 shows an embodiment with two pressure relief valves 35a and 35b between the conduit 32 and the container 22. These valves can be set to give different relief pressure. Valve 35a, for instance, can be set to give a high relief pressure and valve 35b to give a low one.

Between the valves and the conduit 32 a changeover valve 41 is arranged through which either of the valves 35a and 35b may be connected to the conduit 32 depending on the required braking force. For a heavy railway car a high braking force is required, and the valve 35a is connected. For a light railway car a low braking force is required, and the valve 35b is connected. The valve 41 may be operated in response to a control signal from a railway car weighing unit, scales 42, arranged under the rail 1, just in front of the braking unit and connected to the valve 41 by cable 43. The unit 42 may be of the kind disclosed in U.S. Pat. No. 3,103,810, Agerman et al.

Figure 5:
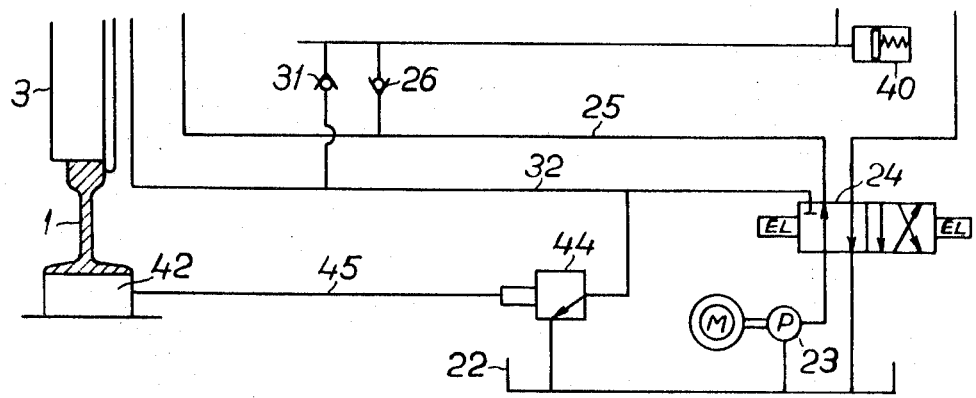

FIG. 5 shows an embodiment with a variable pressure relief valve 44, arranged between the conduit 32 and the container 22 and connected to the weighing unit 42 by a cable 45. The relief pressure of the valve 44 is set in relation to the magnitude of the control signal from the unit 42, which signal is dependent on the weight of the railway car to be braked.

The invention is of course not limited to the embodiments shown in the drawings. Many variations are feasible within the scope of the following claims.

I claim:

1. Marshalling yard retarder comprising a stationary braking means with elongated braking members on both sides of a rail, means mounting said braking members for movement in relation to a vertical plane parallel to the rail for pressure contact with the sides of a wheel passing the rail to effect a braking force on such wheel, and at least one operating member to operate the braking members between a free position and a braking position, in which the operating member comprises at least one hydraulic cylinder with an operating piston, a source of pressure medium, means connecting said hydraulic cylinder to said source to supply pressure medium from said source to the space on one side of the operating piston, said connecting means comprising a supply conduit and a nonreturn valve in said conduit, and a return conduit having at least one pressure-limiting overflow valve therein connecting said space with said source.

2. Retarder according to claim 1, in which the opening pressure of the overflow valve considerably exceeds the operating pressure of the pressure medium supplying means.

3. Retarder according to claim 1, in which said operating member is connected to both braking members.

4. Retarder according to claim 1, in which the braking members on opposite sides of the rail are operated by operating cylinders arranged in pairs and said connecting means comprises a common return conduit and a common overflow valve arranged in this said return conduit.

5. Retarder according to claim 1, in which a pressure accumulator is connected to the connecting means between the cylinder space and the nonreturn valve, which accumulator gives the system resilient properties.

6. Retarder according to claim 1, in which the hydraulic cylinder is resiliently mounted.

7. Retarder according to claim 1, in which said connecting means includes at least two parallel-connected overflow valves which are set to open at different pressures and at least one valve member to connect one or the other of the valves depending on a control signal.

8. Retarder according to claim 7, including weighing means and means connecting the valve member to the weighing means to operate the valve member depending on a control signal from said weighing means.

9. Retarder according to claim 1, having means responsive to a control signal connected to the overflow valve to adjust the opening pressure thereof.

10. Retarder according to claim 1, at least two successively arranged operating cylinders operating on each braking member and a nonreturn valve between each of the successively arranged cylinders and the overflow valve.

* * * * *